US012641040B2

(12) United States Patent　　　(10) Patent No.:　US 12,641,040 B2
Lee et al.　　　　　　　　　　　(45) Date of Patent:　May 26, 2026

(54) DEVICE AND METHOD WITH MULTI-STAGE ELECTRICAL INTERCONNECTION NETWORK

(71) Applicant: SAMSUNG ELECTRONICS CO., LTD., Suwon-si (KR)

(72) Inventors: Wonseok Lee, Suwon-si (KR); Alan Gara, Palo Alto, CA (US); Young Jun Hong, Seoul (KR); Wonyong Lee, Seoul (KR); Wooseok Chang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 18/460,901

(22) Filed: Sep. 5, 2023

(65) Prior Publication Data

US 2023/0412524 A1　　Dec. 21, 2023

Related U.S. Application Data

(63) Continuation of application No. 17/941,334, filed on Sep. 9, 2022.

(Continued)

(30) Foreign Application Priority Data

Apr. 4, 2022　　(KR) ........................ 10-2022-0041698

(51) Int. Cl.
*H04L 49/1515*　　(2022.01)
*H04L 5/00*　　　(2006.01)
*H04Q 3/52*　　　(2006.01)

(52) U.S. Cl.
CPC ........... *H04L 49/1515* (2013.01); *H04Q 3/52* (2013.01); *H04L 5/0001* (2013.01)

(58) Field of Classification Search
None
See application file for complete search history.

(56) References Cited

U.S. PATENT DOCUMENTS 8,037,284 B2　10/2011　Schenfeld et al.
8,285,789 B2　10/2012　Abts et al.
(Continued)

OTHER PUBLICATIONS

Ed Suffern, Norm Strole, Design Considerations for High-Speed Internetworking Among Compute Blades within a Blade Server Chassis, Proceedings of the 28th Annual IEEE International Conference on Local Computer Networks (LCN'03), 2003 (Year: 2003).*
(Continued)

*Primary Examiner* — Ayaz R Sheikh
*Assistant Examiner* — Christopher R Davis
(74) *Attorney, Agent, or Firm* — NSIP Law

(57) ABSTRACT

A device and method that implements a multi-stage electrical interconnection network is provided. The electronic device includes a plurality of computing devices and a plurality of switches grouped into a plurality of groups. Switches, of the plurality of switches, in a same group are configured to be fully connected to computing devices in the same group, each of switches of the plurality of switches included in a first group among the plurality of groups is configured to have a ono-to-one connection with any one of switches included in a second group, and a connection between the computing devices in the same group and the switches in the same group and a connection between switches in in the plurality of groups are electrical connections.

20 Claims, 12 Drawing Sheets

Related U.S. Application Data

(60) Provisional application No. 63/308,358, filed on Feb. 9, 2022.

(56) References Cited

U.S. PATENT DOCUMENTS

| | | | |
|---|---|---|---|
| 9,374,311 B1 | 6/2016 | Zhou et al. | |
| 9,614,786 B2 | 4/2017 | Kim et al. | |
| 9,699,067 B2 | 7/2017 | Haramaty et al. | |
| 10,476,816 B2 | 11/2019 | Leung et al. | |
| 10,742,513 B2 | 8/2020 | Wong | |
| 10,902,549 B2 | 1/2021 | Xu | |
| 2011/0302346 A1* | 12/2011 | Vahdat | H04L 49/40 |
| | | | 710/301 |
| 2018/0089127 A1* | 3/2018 | Flajslik | G06F 13/4022 |
| 2018/0091437 A1* | 3/2018 | Flajslik | H04L 41/0893 |
| 2018/0351812 A1* | 12/2018 | Borch | H04L 41/0896 |
| 2019/0294513 A1* | 9/2019 | Marripudi | G06F 11/2028 |
| 2020/0050523 A1 | 2/2020 | Pawlowski et al. | |
| 2021/0203618 A1 | 7/2021 | Weitz | |
| 2021/0209460 A1 | 7/2021 | Hoefler et al. | |
| 2021/0320820 A1* | 10/2021 | Ruan | H04L 49/602 |

OTHER PUBLICATIONS

Intel Omni-Path Fabric Performance Tuning User Guide Rev. 18.0 (Year: 2020).*

Choquette, Jack, et al. "3.2 the A100 datacenter GPU and Ampere architecture." *2021 IEEE International Solid-State Circuits Conference (ISSCC)*. vol 64. IEEE, (2021). pp. 48-50.

Ajima, Yuichiro, et al. "The Tofu Interconnect D" 2018 IEEE International Conference on Cluster Computing (CLUSTER). IEEE, Sep. 11, 2018, (28 pages in English).

* cited by examiner

DEVICE AND METHOD WITH MULTI-STAGE ELECTRICAL INTERCONNECTION NETWORK

CROSS-REFERENCE TO RELATED APPLICATIONS

This application is a Continuation application of U.S. patent application Ser. No. 17/941,334, filed on Sep. 9, 2022, which claims the benefit under 35 U.S.C. § 119(e) of U.S. Provisional Application No. 63/308,358 filed on Feb. 9, 2022, in the U.S. Patent and Trademark Office, and claims the benefit under 35 USC § 119(a) of Korean Patent Application No. 10-2022-0041698 filed on Apr. 4, 2022, in the Korean Intellectual Property Office, the entire disclosures of which are incorporated herein by reference for all purposes.

BACKGROUND

1. Field

The following description relates to a device and method with a multi-stage electrical interconnection network.

2. Description of Related Art

As the size of applications processed in large-scale computing systems increases, information that is exchanged between processors and/or memories is becoming more frequent. When application performance is limited by an input/output (I/O) bandwidth, securing a sufficient bandwidth may be desirable.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a device includes a plurality of computing devices and a plurality of switches respectively grouped into a plurality of groups, wherein switches, of the plurality of switches, in a same group of the plurality of groups, are configured to be fully connected to computing devices, of the plurality of computing devices, in the same group, wherein each of multiple switches of the plurality of switches, comprised in a first group among the plurality of groups is configured to have a one-to-one connection with any one of multiple switches of the plurality of switches comprised in a second group among the plurality of groups; and wherein electrical connections are provided between the computing devices in the same group and the switches in the same group, and electrical connections are provided between respective switches in one or more other groups of the plurality of groups.

The switches in the same group may be connected to the computing devices in the same group, and the computing devices in the same group may be connected to the switches in the same group.

The switches in the same group may be connected to each other.

A total number of the switches in the same group may be less than or equal to a total number of lanes allocated to each of the computing devices in the same group.

The total number of the switches in the same group may be determined based on a result obtained by dividing, by an integer, the total number of lanes.

A same total number of lanes allocated to each of the computing devices in the same group may be allocated to the switches in the same group.

A total number of the computing devices in the same group may be determined based on a total number of the switches in the same group, a total number of lanes allocated to each of the switches in the same group, and a total number of lanes allocated to each of the computing devices in the same group.

For switch connections between groups of the plurality of groups, each of the plurality of groups may use a mid-plane printed circuit board (PCB) and a connector connected through a cable.

A total number of respective computing devices in each of the plurality of groups may be a same number.

A total number of respective switches in each of the plurality of groups may be a same number.

Each of the plurality of computing devices may include a processor and/or a high bandwidth memory (HBM).

The connections between the computing devices in the same group and the switches in the same group, and the connections between the respective switches may be implemented based on a link budget.

The link budget may be a peripheral component interconnect express (PCIe) link budget.

In a general aspect, a device includes a plurality of computing devices and a plurality of switches respectively grouped into a plurality of groups, wherein the plurality of groups may be physically separated from each other in respective different circuitries; and wherein connections between computing devices of the plurality of computing devices in a same group and switches of the plurality of switches in the same group and connections may be provided between respective switches in the plurality of groups are based on an electrical interconnection network.

In a general aspect, a method includes partitioning data to be transmitted from a first computing device in a first group to a second computing device in a second group, and transmitting the partitioned data to first switches in the first group based on a full electrical connection between the first computing device and each of the first switches in the first group; transmitting the partitioned data to second switches in the second group based on an electrical connection between the first switches in the first group and the second switches in the second group; and transmitting the partitioned data from the second switches to the second computing device based on a full electrical connection between each of the second switches and the second computing device; wherein each one of the first switches is configured to have a one-to-one connection with a corresponding one of the second switches.

Switches in a same group may be connected to computing devices in the same group, and computing devices in the same group may be connected to switches in the same group.

Switches in a same group may not be connected to each other.

A total number of switches in a same group may be less than or equal to a total number of lanes allocated to each computing device in the same group.

A total number of the switches in the same group may be determined based on a result obtained by dividing, by an integer, the total number of the lanes.

A same total number of lanes allocated to each computing device in a same group may be allocated to each switch in the same group.

A total number of computing devices in a same group may be determined based on a total number of switches in the same group, a total number of lanes allocated to each of the switches, and a total number of lanes allocated to each of the computing devices.

In a general aspect, a method includes grouping a plurality of first processors and a plurality of first switches into a first group; allocating, by each of the plurality of first processors, a total number of lanes to each of the plurality of first switches; allocating, by each of the plurality of first switches, the total number of lanes to each of the plurality of first processors; grouping a plurality of second processors and a plurality of second switches into a second group; and transmitting data from the plurality of first processors of the first group to the plurality of second processors of the second group by partitioning the data into the total number of lanes, and transmitting the data from the plurality of first processors to the plurality of second processors through the plurality of first switches and the plurality of second switches.

Each one of the plurality of first switches of the first group may be configured to have a one-to-one connection with a corresponding one of the plurality of second switches of the second group.

The data may be transmitted at a same bandwidth.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
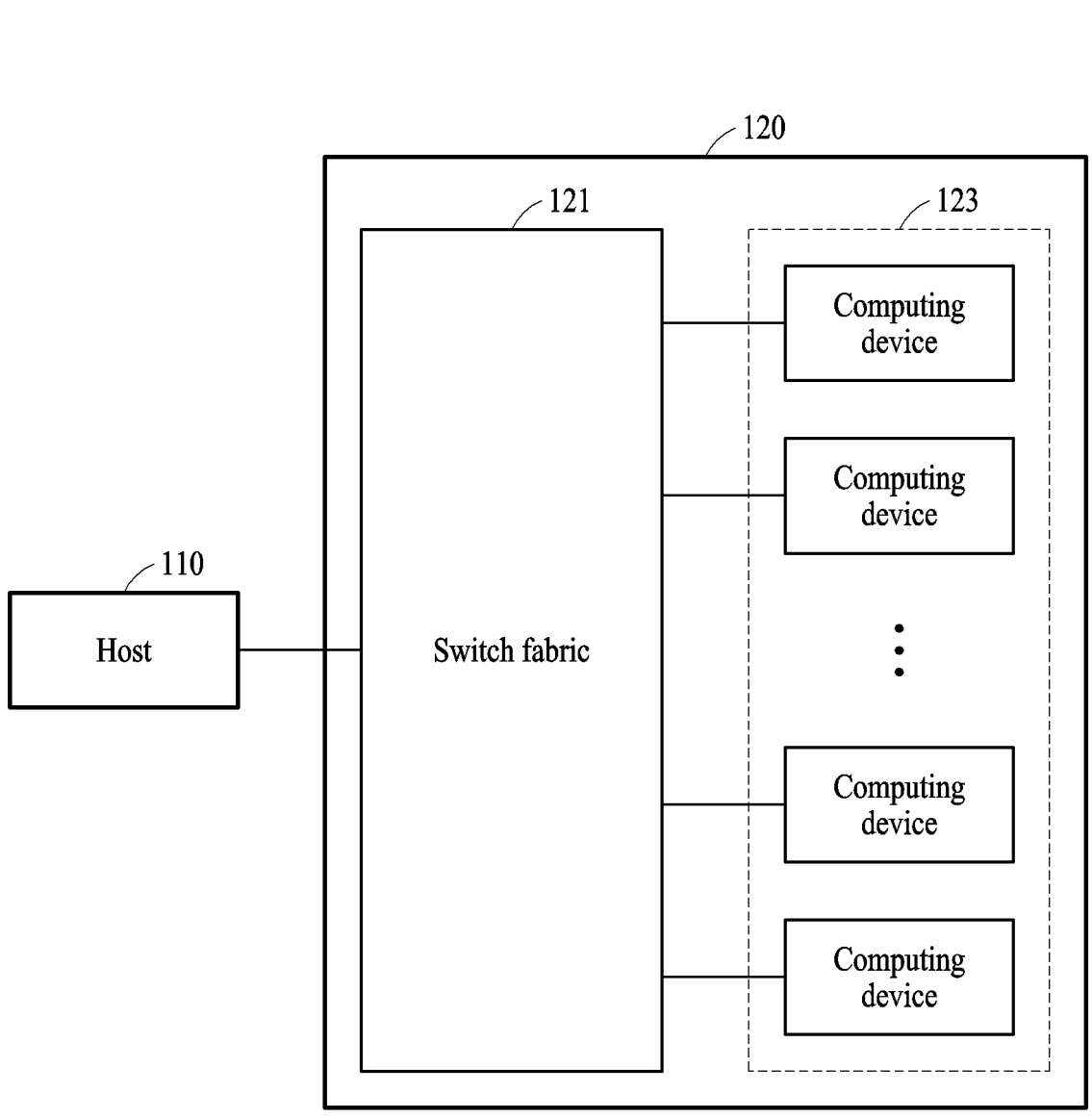
FIG. 1 illustrates an example electronic device, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Additionally, in the description of example embodiments, detailed description of structures that are thereby known after an understanding of the disclosure of the present application may be omitted when it is deemed that such description may cause ambiguous interpretation of the example embodiments.

Figure 2:
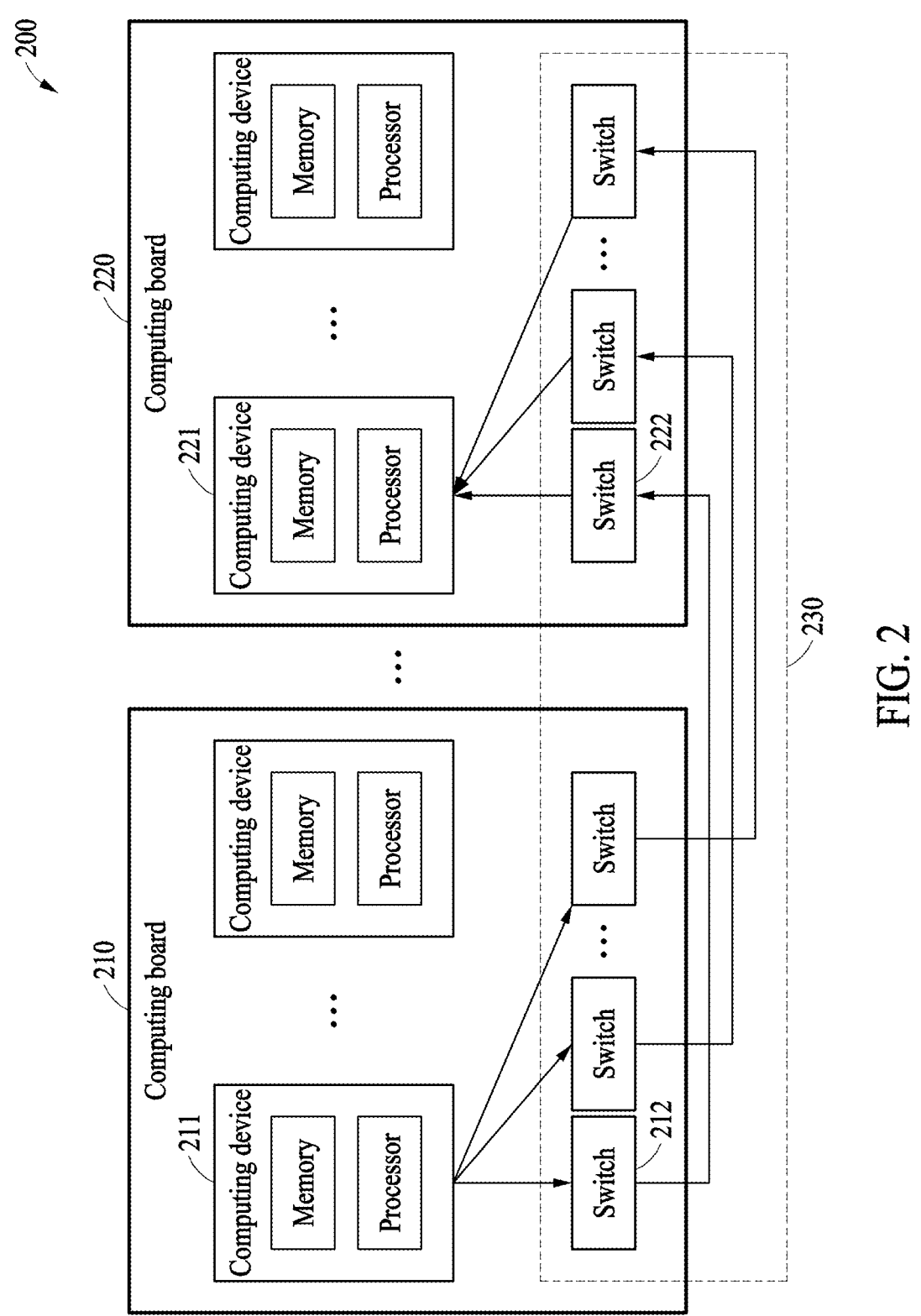
FIG. 2 illustrates an example electronic device, in accordance with one or more embodiments

FIGS. 1 and 2 illustrate examples of an electronic device, in accordance with one or more embodiments.

Referring to FIG. 1, an example electronic device 100 may include a host 110 and a computing node 120. In an example, the host 110 may be a device that is configured to control the computing node 120, and for example, may control data transmission from any one of a plurality of computing devices 123 to another of the computer devices 123.

In an example, the electronic device 100 may be a computing device that is configured to connect the respective computing devices 123 to a multi-stage electrical interconnection network. The electronic device 100 may i be various computing devices such as, but not limited to, a high-performance computer (HPC), a desktop, a workstation, or a server, as non-limiting examples.

An electrical interconnection network may be made up of, as only examples, electrical wiring on a printed circuit board (PCB), and may thus be more cost-effective and may be constructed in a more structurally simpler manner compared to a typical optical interconnection network that has a high power consumption for electrical-to-optical signal transformation and a high cost for fiber-optic cables. In a typical electrical interconnection network, an insertion loss may increase with a signal speed increase to several tens of gigahertz (GHz), and a connectable distance may thereby be limited. However, in one or more embodiments such a limitation may be avoided through a multi-stage switch fabric 121 that is described below. The example electronic device 100 may support a large-scale computing device pool based on physical properties of the electrical interconnection network.

The switch fabric 121 may include a plurality of switches configured to connect the respective computing devices 123. When transmitting data from any one of the computing devices 123 to another of the computing devices 123, the switch fabric 121 may partition the data and transmit the partitioned data through the switches connected over the electrical interconnection network, and thus may efficiently maintain bandwidth performance among the computing devices 123.

The switches included in the switch fabric 121 may be grouped, with the computing devices 123, into a plurality of groups, and a range of the single computing node 120 may be expanded by maximizing a connection between the computing devices 123 over the multi-stage electrical interconnection network that is classified into intra-group and inter-group. The range of the single computing node 120 may be expanded according to an implementation target for an application of the electronic device 100.

Although FIG. 1 illustrates an example electronic device 100 including a single computing node (e.g., the computing node 120) for ease of description, the electronic device 100 is not limited thereto and may include a plurality of computing nodes 120. In this example, the computing nodes included in the electronic device 100 may be connected over the optical interconnection network.

The electronic device 100 is also representative of including a disaggregated resource such as a storage and a non-volatile memory, an optical network, and an additional system and network for management, as non-limiting examples.

By expanding the range of the computing node 120 over an extended electrical interconnection network in which a plurality of switches are connected in the form of a fabric, the electronic device 100 may effectively maintain bandwidth performance even without implementing the optical interconnection network that implements an expensive optical cable.

Referring to FIG. 2, a computing node 200 may include a plurality of computing boards (or mounting supports) 210 and 220.

A plurality of computing devices 211, 221 and switches 212, 222 included in the computing node 200 may be grouped into a plurality of groups. In an example, computing devices 222, 221 and switches 212, 222 which are grouped into each of the respective groups may be respectively included in the same computing board 210 or 220. In a non-limited example, the total number of computing devices included in each of the groups may be the same. Additionally, as a non-limiting example, the total number of switches included in each of the respective groups may be the same.

In an example, a computing device may include a memory and/or a processor. The memory, a device configured to store data, may be a high bandwidth memory, for example. The processor, a device configured to perform a control electronic-based operation, may be a cross point unit (xPU) such as, but not limited to, a central processing unit (CPU), a graphics processing unit (GPU), a neural processing unit (NPU), a tensor processing unit (TPU), and the like.

In an example, a connection between computing devices and switches in the same computing board and a connection between switches in different computing boards may be based on an electrical interconnection network. In an example, the computing board may be printed circuit boards (PCBs). In an example, when data is transmitted from a first computing device 211 included in the first computing board 210 to a second computing device 221 included in the second computing board 220, the data that is partitioned from the first computing device 211 may be transmitted to the second computing device 221 through respective switches of a switch fabric 230. In an example, the first computing device 211 may partition the data and transmit the partitioned data to first switches 212 included in the first computing board 210, the first switches 212 may transmit the partitioned data to second switches 222 included in the second computing board 220, and then the second switches 222 may transmit the partitioned data to the second computing device 221. This may effectively prevent data transmission from being limited by a bandwidth. Although described further with reference to FIGS. 3 and 4, the first computing device 211 of the first computing board 210 may be connected to all of the first switches 212 included in the first computing board 210. In an example, each of the first switches 212 of the first computing board 210 may be connected on a one-to-one basis to a corresponding second switch 222 of the second computing board 220, and all of the second switches 222 included in the second computing board 220 may be connected to the second computing device 221.

Through a structure of the switch fabric 230, input/output (I/O) bandwidth performance among all the computing devices in the computing node 200 may be effectively maintained, and the structure of the switch fabric 230 will be described further with reference to FIGS. 3 and 4.

Figure 3:
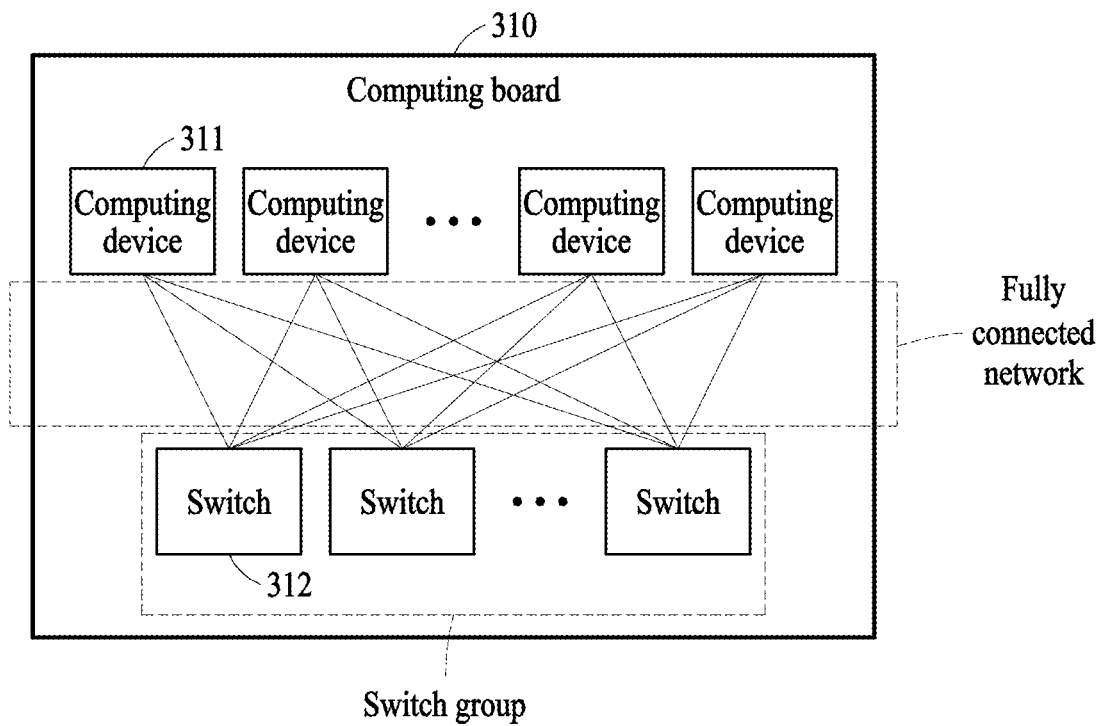
FIG. 3 illustrates an example connection in a computing board, in accordance with one or more embodiments.

FIG. 3 illustrates an example connection in a computing board, in accordance with one or more embodiments.

Referring to FIG. 3, computing devices 311 and switches 312 in a computing board 310 may be grouped into the same group, and may be fully connected to each other. As a non-limiting example, the computing board 310, the switches 312, and/or the computing devices 311 may correspond to any of the computing board 210, computing devices 211, and switches 212 of FIG. 2. Being "fully connected" may mean that each of the computing devices 311 may be electrically connected to all the switches 312 in the same group, and each of the switches 312 may be connected to all the computing devices 311 in the same group. In this example, each of the computing devices 311 may be connected to the switches 312 at the same bandwidth, and each of the switches 312 may be connected to the computing devices 311 at the same bandwidth.

In the same group, the computing devices 311 may not be connected to each other, and the switches 312 may also not be connected to each other. That is, in the same group, a computing device 311 may not be connected to another computing device, and a switch 312 may not be connected to another switch.

As illustrated in FIG. 3, a plurality of switches in a single computing board may be referred to as a switch group.

Figure 4:
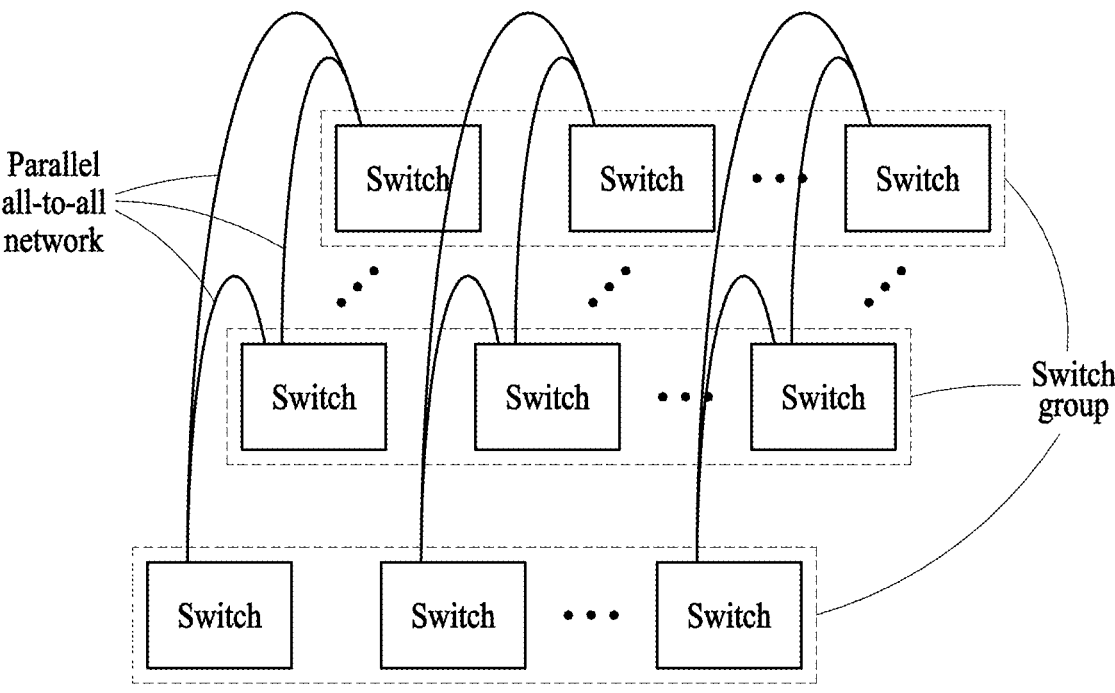
FIG. 4 illustrates an example connection between switches, in accordance with one or more embodiments.

FIG. 4 illustrates an example connection between switches, in accordance with one or more embodiments.

Referring to FIG. 4, switch groups of different, for example, computing boards are illustrated as being connected all-to-all in parallel. Each of the switch groups may include respective switches included in a corresponding same computing board, and each computing board may include plural computing devices. For brevity of discussion, further discussion of such a configuration of a discussion of a computing node may be omitted in FIG. 4 for ease of description. A connection between the switch groups illustrated in FIG. 4 may represent an electrical connection between switches in different computing boards. As a non-limiting example, the switches of FIG. 4 may correspond to switches 212 and switches 312 of FIGS. 2 and 3.

Each of the switches included in a group may be exclusively connected to any one of switches included in another group. For example, an nth switch included in one group may be connected only to an nth switch among switches included in another group and may not be connected to the remaining switches in the another group. For example, a first switch included in a first group may be connected to first switches included in second through kth groups, and the first switches included in first through kth groups may be connected to each other at the same bandwidth. In an example, n and k may be natural numbers.

However, the foregoing description is provided for ease of description and may be applicable to examples where an nth switch included in a first group is not connected to an nth switch included in a second group, but may instead be connected to any one of switches included in the second group and this switch may not be connected to a switch which is not the nth switch included in the first group. A network having such a connection structure may be referred to as a parallel all-to-all network.

Figure 5:
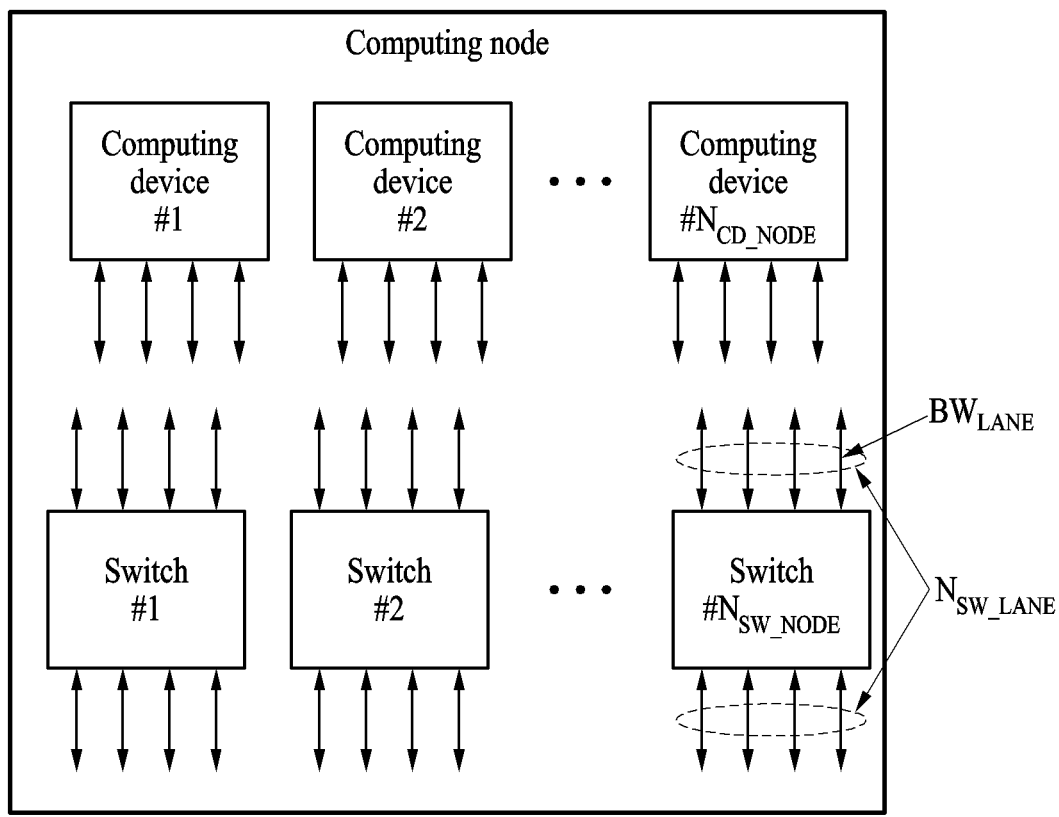
FIG. 5 illustrates an example connection bandwidth in a computing node, in accordance with one or more embodiments.
Figure 6:
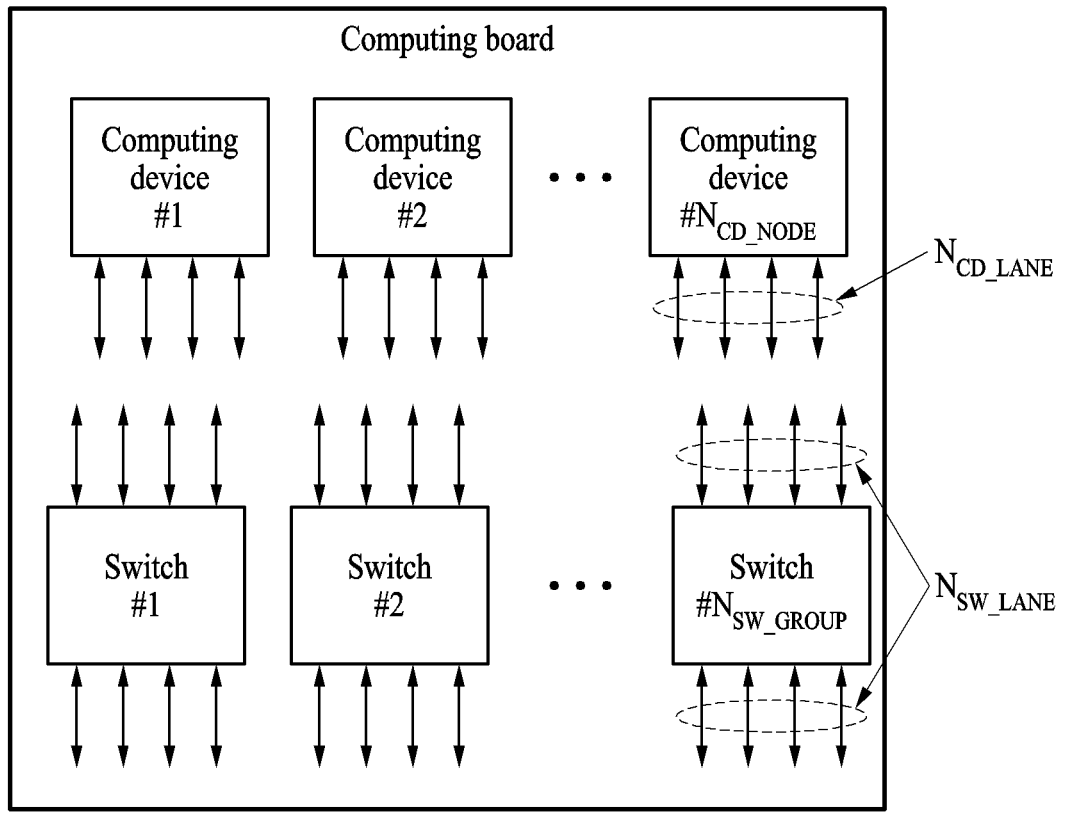
FIG. 6 illustrates an example connection bandwidth in a group corresponding to a computing board, in accordance with one or more embodiments

FIGS. 5 and 6 illustrate an example connection bandwidth, in accordance with one or more embodiments.

Referring to FIG. 5, an example of a connection bandwidth in a computing node is illustrated. The computing node may include $N_{CD\_NODE}$ computing devices, and $N_{SW\_NODE}$ switches. In the example of FIG. 5, each of the switches may include $N_{SW\_LANE}$ lanes and a bandwidth of each of the lanes may be $BW_{LANE}$. A total I/O bandwidth per switch $BW_{SW}$ may be $BW_{LANE} \times N_{SW\_LANE}$. As a non-limiting example, the switches and/or the computing devices of FIG. 5 may correspond to any of the computing devices 211, and switches 212 and 312, and other switches of FIGS. 2, 3 and 4.

In an example, target performance $P_{TARGET}$ and a target I/O bandwidth $BW_{TARGET}$ for a computing node in an electronic device corresponding to a HPC may be preset. In this example, the number $N_{CD\_NODE}$ of the computing devices in the computing node and the number $N_{SW\_NODE}$ of the switches in the computing node may be determined by Equation 1 below, as a non-limiting example.

$$N_{CD\_NODE} \geq P_{TARGET}/P_{CD}$$

$$N_{SW\_NODE} \geq 2 \times BW_{TARGET}/BW_{SW} \qquad \text{Equation 1:}$$

In Equation 1, $P_{CD}$ denotes operation performance per computing device, and $BW_{SW}$ denotes the total I/O bandwidth per switch.

The computing node may include $N_{GROUP}$ computing groups including the $N_{CD\_GROUP}$ computing devices and the $N_{SW\_GROUP}$ switches, and a bandwidth in the computing groups will be described further with reference to FIG. 6.

Referring to FIG. 6, an example of a connection bandwidth in a group corresponding to a computing board is illustrated. As described above, each of computing devices in the same group may be connected to switches at the same bandwidth, and each of the switches may be connected to the computing devices at the same bandwidth. Accordingly, each of the computing devices may allocate the same total number of lanes to the switches and each of the switches may allocate the same total number of lanes to the computing devices.

The total number of switches in a group $N_{SW\_GROUP}$ may be less than or equal to the total number of I/O lanes $N_{CD\_LANE}$ allocated to a computing device, and the same total number (e.g., $N_{CD\_LANE}/N_{SW\_GROUP}$) of computing device lanes may be allocated to the switches in the same group. In an example, when the total number of computing device lanes $N_{CD\_LANE}$ is 32, the total number of switches in a group $N_{SW\_GROUP}$ may be any one of 32, 16, 8, 4, and 2.

The total number of computing devices in a group $N_{CD\_GROUP}$ may be determined based on the total number of switches $N_{SW\_GROUP}$ determined based on the total number of computing device lanes $N_{CD\_LANE}$. In an example, $N_{CD\_GROUP}$ may be determined based on $(N_{SW\_LANE} \times N_{SW\_GROUP})/(2 \times N_{CD\_LANE})$.

Figure 7:
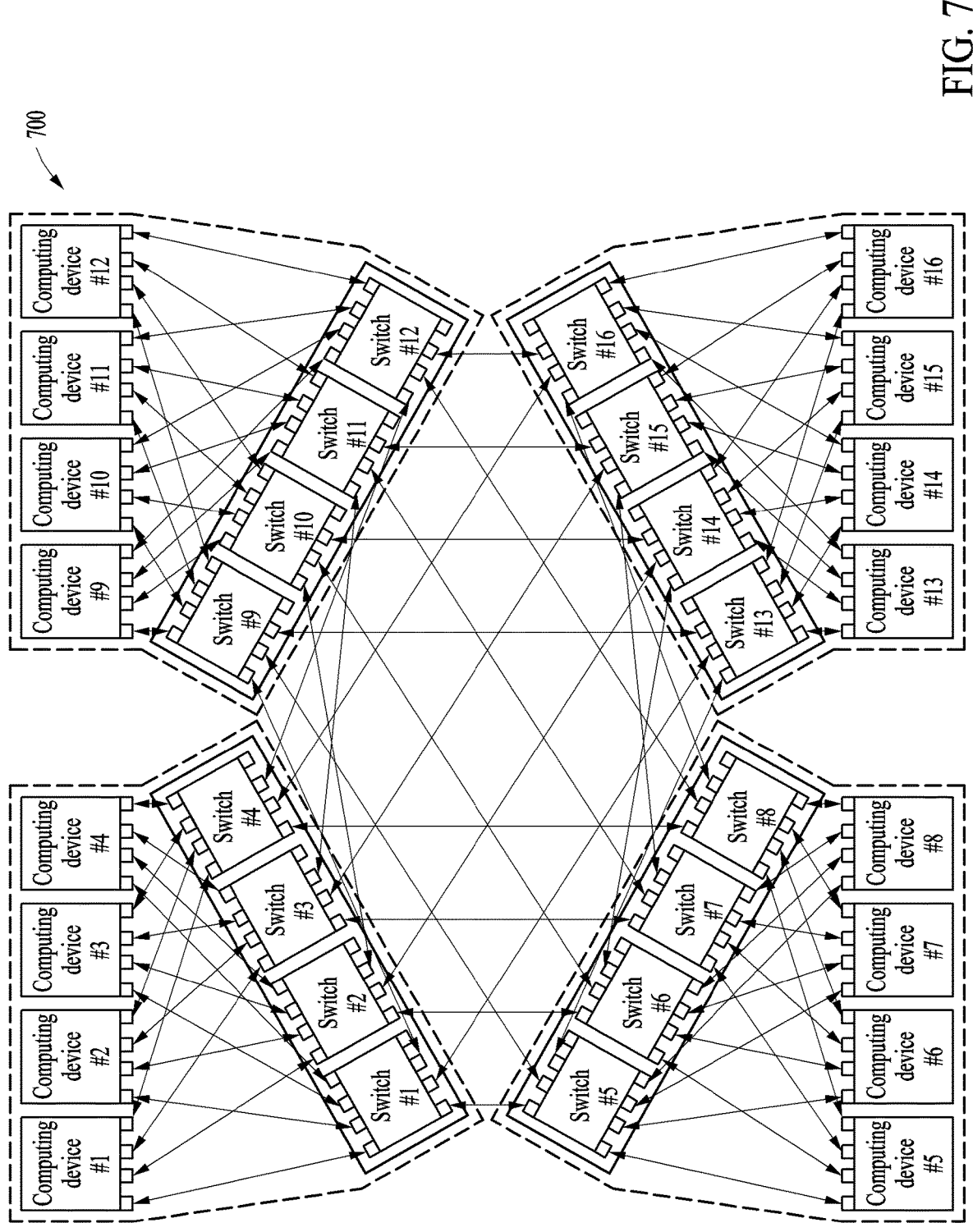
FIG. 7 illustrates an example connection structure of a computing node, in accordance with one or more embodiments.

FIG. 7 illustrates an example connection structure of an example computing node, in accordance with one or more embodiments.

Referring to FIG. 7, an example in which computing devices and switches included in a computing node 700 are grouped into a plurality of groups is illustrated. Each of the plurality of groups may correspond to a computing board.

In an example, assuming that, when a target computing node of which a size is $BW_{TARGET}=1{,}024$ GB/s with reference to $N_{CD\_NODE}=16$, PCIe Gen 4 ($BW_{LANE}=4$ GB/s), $N_{CD\_LANE}=16$ (4 lanes per line illustrated in FIG. 7) and a 32-lane switch ($N_{SW\_LANE}=32$) may be implemented, $N_{SW\_NODE}\geq 2\times BW_{TARGET}/BW_{SW}=2\times BW_{TARGET}/(BW_{LANE}\times N_{SW\_LANE})=2\times1{,}024/(4\times32)=16$, $N_{SW\_GROUP}=N_{CD\_LANE}/n=16/4=4$ (where, n=4), $N_{CD\_GROUP}=(N_{SW\_LANE}\times N_{SW\_GROUP})/(2\times N_{CD\_LANE})=(32\times4)/(2\times16)=4$, intra-group (computing device-to-switch in the same group), connected by $N_{CD\_LANE}/N_{SW\_GROUP}=16/4=4$ lanes, inter-group (switch-to-switch between different groups), and connected by $N_{CD\_LANE}/N_{SW\_GROUP}=4$ lanes.

In a non-limiting example, the computing devices and the switches included in the computing node 700 may be grouped into four groups and each of the groups may include four computing devices and four switches.

In a non-limiting example, each of the computing devices may have 16 lanes, and each of the lanes may be connected to one of four switches in the same group. Each of the switches may have 32 lanes and each of 16 lanes thereof may be connected to one of four computing devices in the same group. Computing devices and switches in the same group may be fully connected over an electrical interconnection network.

In an example, switches in different groups may be connected all-to-all in parallel over the electrical interconnection network. Each of switches included in a group may be exclusively connected to any one of switches included in a corresponding group. In a non-limited example, a first switch in a first group may be connected only to a fifth switch in a second group, and may not be connected to sixth through eighth switches among the switches in the second group. Similarly, the fifth switch in the second group may be connected only to the first switch in the first group, and may not be connected to second through fourth switches among the switches in the first group.

In an example, data transmission from a first computing device in the first group to a fifth computing device in the second group will be described. The first computing device may partition data into four parts and transmit the respective partitioned data to the first through fourth switches at a same bandwidth. Each of the first through fourth switches may transmit the received partitioned data to a switch, connected in a one-to-one manner to itself, among the fifth through eighth switches in the second group. The fifth through eighth switches of the second group may transmit the received partitioned data to the fifth computing device. Through a one-to-many connection between a computing device and a plurality of switches, and a one-to-one connection between switches in different groups (e.g., between the first group and the second group), data may be efficiently transmitted without being limited by an I/O bandwidth.

In the example illustrated in FIG. 7, each of the switches may use 28 lanes of 32 lanes, and therefore the computing node 700 may further include an additional one group, using the remaining 4 lanes in each of the switches. Accordingly, by adding a group within a range of lanes allowed by switches, a range of the computing node 700 may be easily expanded.

Figure 8:
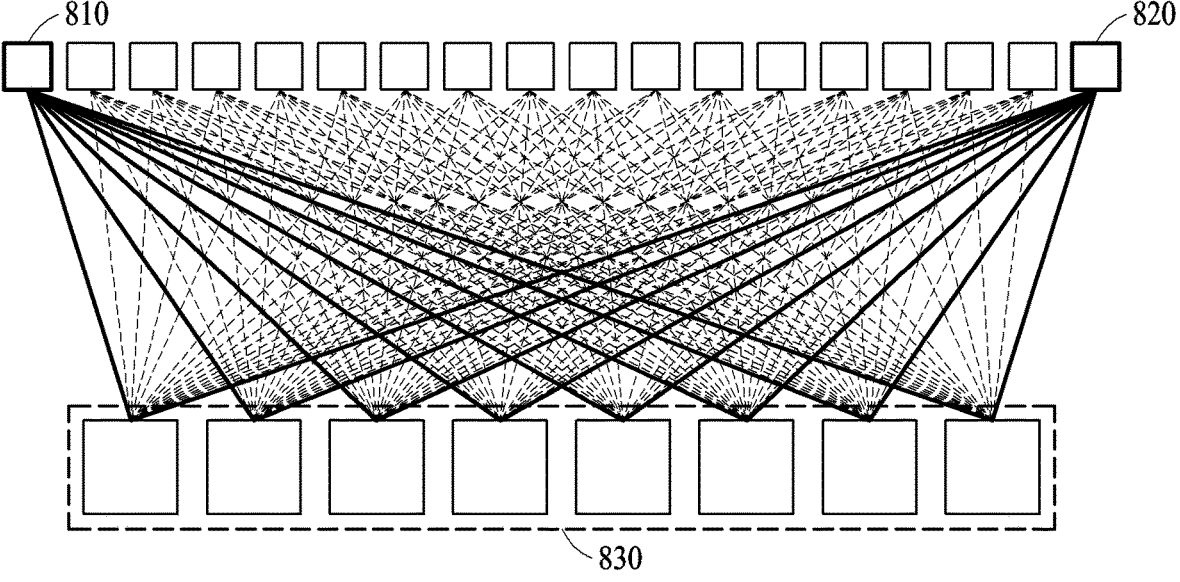
FIG. 8 illustrates an example of partitioning data and transmitting the partitioned data from one computing device to another computing device, in accordance with one or more embodiments.

FIG. 8 illustrates an example of partitioning data and transmitting the partitioned data from one computing device to another computing device, in accordance with one or more embodiments.

Referring to FIG. 8, an example process in which a first computing device 810 transmits data to a second computing device 820 through a switch fabric 830 at a same bandwidth is illustrated. In an example, the first computing device 810 and the second computing device 820 may belong to the same group. Alternately, the first computing device 810 and the second computing device 820 may belong too different groups. Through the switch fabric 830, data may be transmitted to any computing device without an I/O bandwidth limit. In an example, all computing devices may be connected at a uniform bandwidth.

Figure 9:
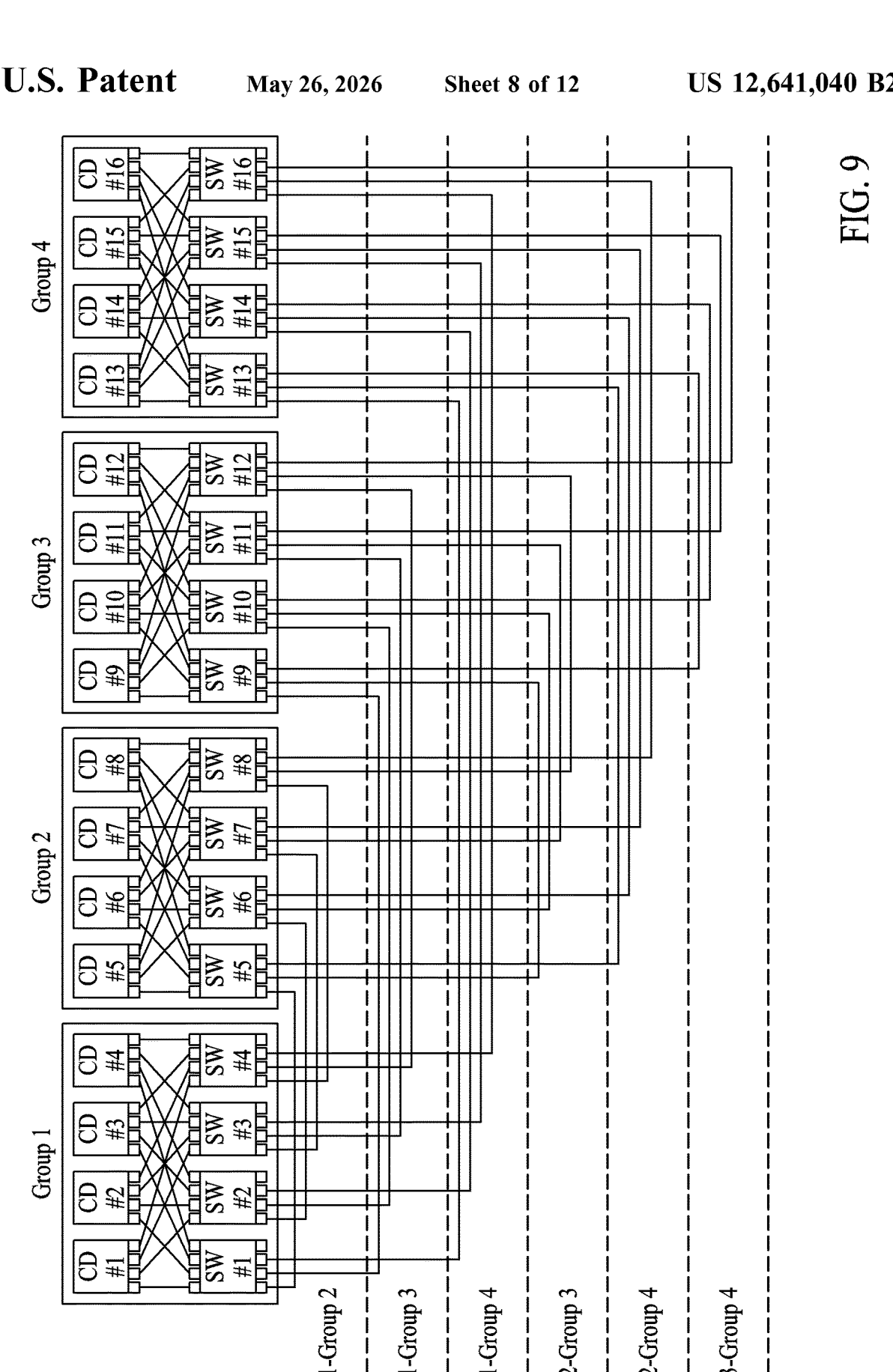
FIG. 9 illustrates an example computing node, in accordance with one or more embodiments.
Figure 10:
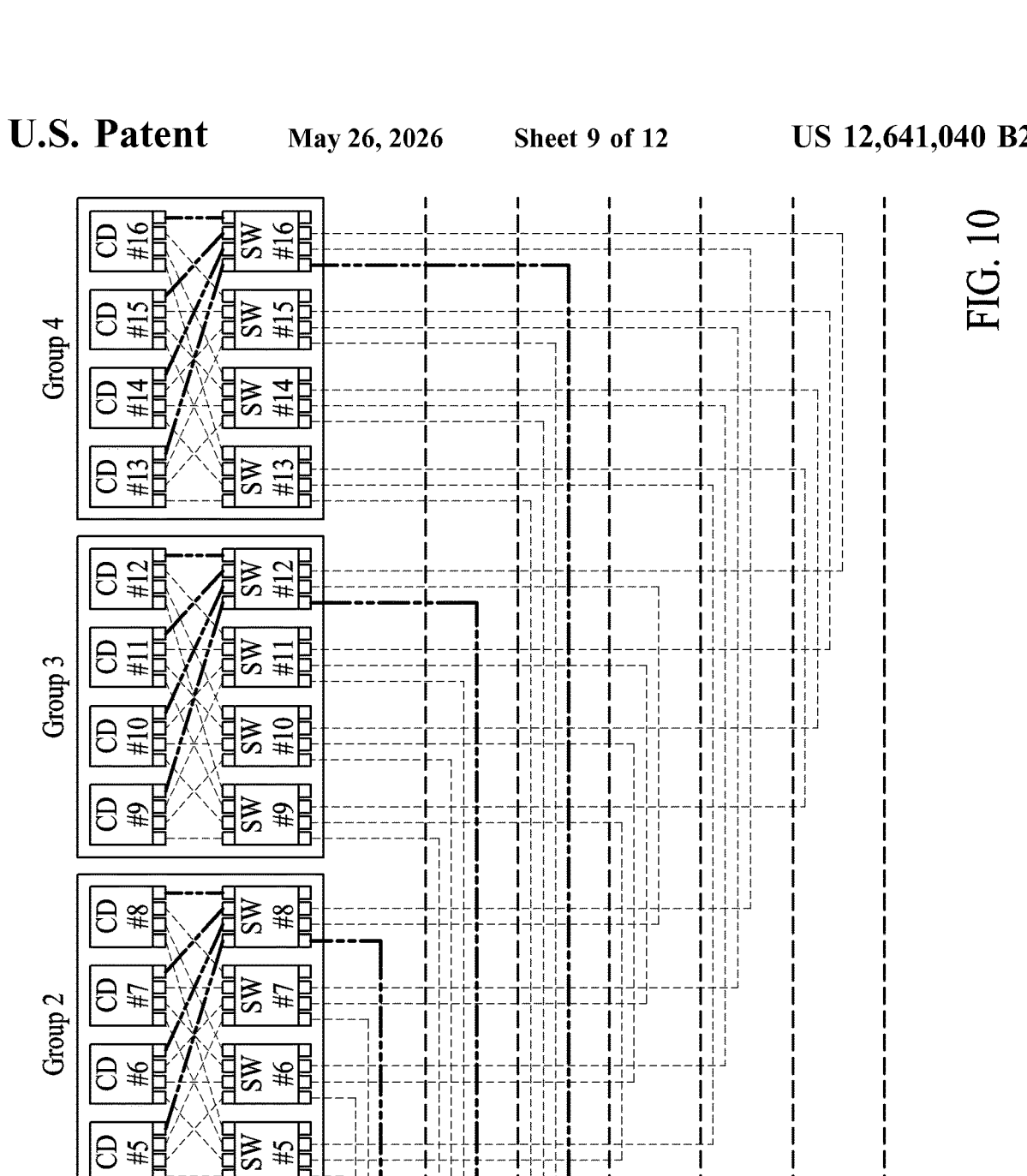
FIG. 10 illustrates example computing device connections, in accordance with one or more embodiments.
Figure 11:
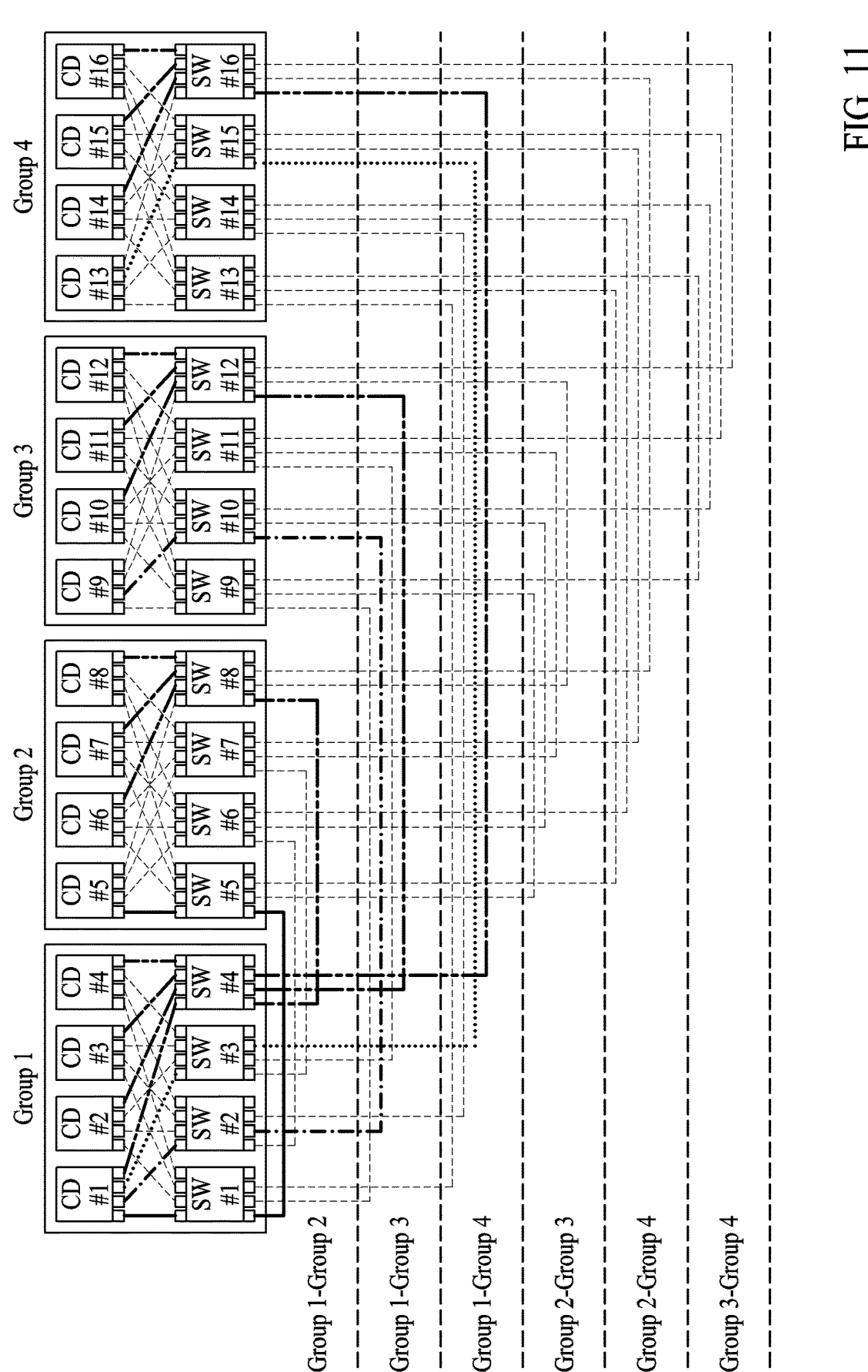
FIG. 11 illustrates example computing device connections, in accordance with one or more embodiments.

FIGS. 9 through 11 each illustrate an example of various connections, in accordance with one or more embodiments.

FIG. 9 illustrates an example computing node, in accordance with one or more embodiments.

Referring to FIG. 9. in an example, computing devices, (illustrated as 'CD' in FIG. 9), and switches, (illustrated as 'SW' in FIG. 9), included in the computing node, may be grouped into four groups. An expansion to an additional group 5 (not shown) may be readily available when implementing a last port not connected to another group among four uplink ports of each switch as illustrated in FIG. 9. In this example, a parallel all-to-all connection may be performed on between group 1 and group 5, group 2 and group 5, group 3 and group 5, and group 4 and group 5. An uplink port may refer to a port implemented in each switch for a connection to a switch in another group, and a downlink port may refer to a port used in each switch for a connection to a computing device in the same group.

Referring to FIG. 10, a computing device #1 may be connected to two or more computing devices (e.g., computing devices #2 to #4) in the same group by dividing a bandwidth through switches #1 to #4 in the same group. Additionally, the computing device #1 may be connected to one or more computing devices among computing devices (e.g., computing devices #5 to #16) in other groups through switch #1 to switch #4 in the same group. In other words, a computing device of a first group may simultaneously access four or more other computing devices of other groups when using four switches in the same group, i.e., the first group.

Referring to FIG. 11, a computing device #1 may be connected to two or more computing devices (e.g., computing devices #5, #9, or #13) in another group by dividing a bandwidth through switches #1 to #3 in the same group. Additionally, the computing device #1 may be connected to one or more computing devices among computing devices (e.g., computing devices #2 to #4) in the same group and computing devices (e.g., computing devices #6 to #8, #10 to #12, or #14 to #16) in another group through a switch #4 in the same group. In other words, a computing device may simultaneously access four or more other computing devices when implementing four switches in the same group.

Figure 12:
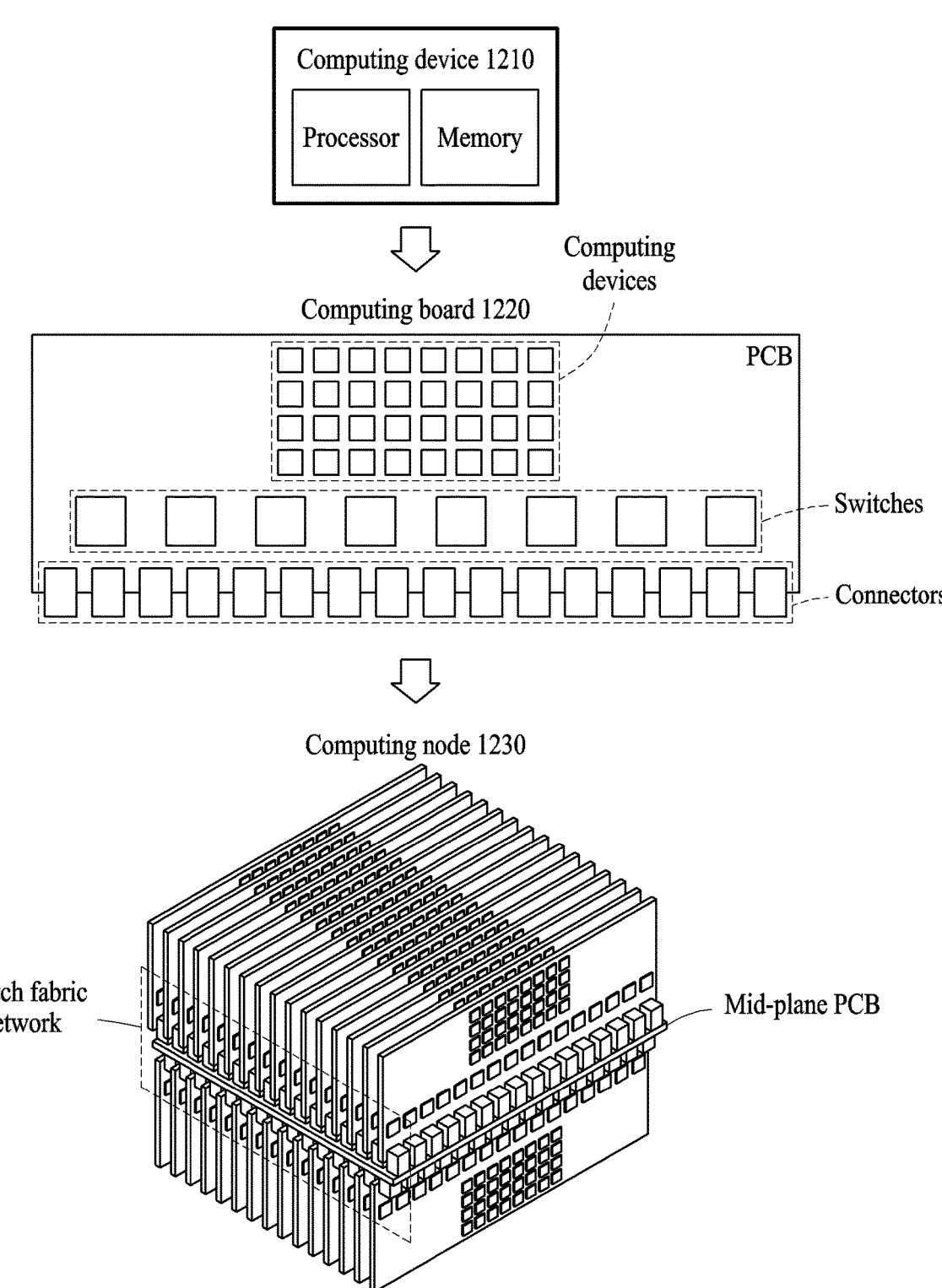
FIG. 12 illustrates an example computing device, computing board, and computing node, in accordance with one or more embodiments.

FIG. 12 illustrates an example computing device 1210, computing board 1220, and computing node 1230, in accordance with one or more embodiments.

In an example, the computing board 1220 may include a plurality of computing devices and switches in a PCB within a predetermined range based on a link budget of an electrical interface. In an example, for a fifth generation of peripheral component interconnect express (PCIe Gen 5) (e.g., bit rate: 32 gigatransfers per second (GT/s)), in consideration of a loss budget of −36 decibels (dB), the computing board 1220 may be implemented in such a way that a trace length between a computing device and a PCIe switch may be less than 460 millimeters (mm) based on a Megtron6 PCB.

In the example illustrated in FIG. 12, the computing board 1220 may include 32 computing devices, 16 switches (8 on each of the front and back sides of the computing board 1220), and 16 connectors. The connectors may electrically connect each of the computing board 1220 to a mid-plane PCB of the computing node 1230. As a non-limiting example, the computing devices and the switches may correspond to any of the computing devices and switches discussed herein.

The computing node 1230 may connect a plurality of computing boards 1220 to the mid-plane PCB by implementing a connector within a range allowed by the link budget. The link budget may be reset when passing through a switch.

The total I/O bandwidth of switches in the computing board 1220 may be implemented to be greater than or equal to (the total I/O bandwidth of computing devices in the computing board 1220)+(the number of computing boards in the computing node 1230×an I/O bandwidth of a single computing device).

In an example, all of the switches of the computing node 1230 may be electrically connected over a switch fabric network, for example. The computing node 1230 may support a large-scale high bandwidth memory (HBM) pool by maximizing an electrical interconnection network using a PCB.

Figure 13:
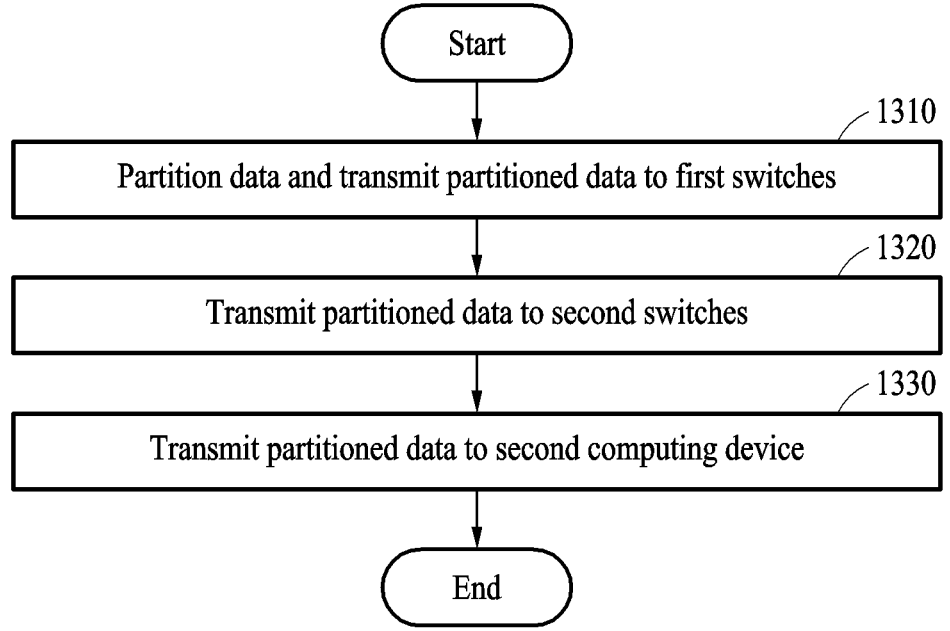
FIG. 13 illustrates an example operating method of an example electronic device, in accordance with one or more embodiments.

FIG. 13 illustrates an example operating method of an electronic device, in accordance with one or more embodiments. The operations in FIG. 13 may be performed in the sequence and manner as shown. However, the order of some operations may be changed, or some of the operations may be omitted, without departing from the spirit and scope of the shown example. Additionally, operations illustrated in FIG. 13 may be performed in parallel or simultaneously. One or more blocks of FIG. 13, and combinations of the blocks, can be implemented by special purpose hardware-based computer that perform the specified functions, or combinations of special purpose hardware and instructions, e.g., computer or processor instructions. In addition to the description of FIG. 13 below, the descriptions of FIGS. 1-12 are also applicable to FIG. 13 and are incorporated herein by reference. Thus, the above description may not be repeated here for brevity purposes. The operations of FIG. 13 may be performed by a processor.

In operation 1310, the electronic device may be configured to partition data to be transmitted from a first computing device in a first group to a second computing device in a second group and transmit the partitioned data to first switches in the first group based on a full electrical connection between the first computing device and the first switches included in the first group. Each of the first switches may be exclusively connected to any one of second switches.

In operation 1320, the electronic device may be configured to transmit the partitioned data to the second switches in the second group based on an electrical connection between the first switches in the first group and the second switches in the second group.

In operation 1330, the electronic device may be configured to transmit the partitioned data received by the second switches to the second computing device based on a full electrical connection between the second switches and the second computing device.

In an example, the switches in the same group may be uniformly connected to computing devices in the group, and the computing devices in the same group may be uniformly connected to the switches in the group. In an example, some or all switches in the same group may not be connected to each other.

The total number of the switches included in the same group may be less than or equal to the total number of lanes allocated to each of the computing devices included in the same group. The total number of switches included in the same group may be determined based on a result obtained by dividing, by an integer, the total number of lanes allocated to each of the computing devices included in the same group. The same number of lanes of each of computing devices in the same group may be allocated to switches in the same group. The total number of the computing devices included in the same group may be determined based on the total number of the switches included in the same group, the total number of lanes allocated to each of the switches, and the total number of lanes allocated to each of the computing devices.

The electronic device described above may be, or used to configure, a network by introducing a supercomputer node or may be, or applied to, a large-scale supercomputer system. Additionally, the electronic device may be, or applied to configure, a network in a single node of a general computing environment besides an HPC environment or a network between nodes in various computing cluster environments such as a data center and the like.

Additionally, the electronic device may be a memory- and network-centric HPC system device by maximizing an HBM pool. The electronic device may configure a switch fabric network, implementing a plurality of electrical switches. In an example, an efficient switch fabric network structure embodiment may prevent degradation of an I/O bandwidth between computing devices in a computing node.

The host 110, computing nodes 120, 200, 700, and 1220, switch fabric 121 and 830, computing devices 123, 211, 311, 810, 820, and 1210, switches 212, 222, and 312, computing boards 210, 220, 310, and 1220, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-13, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
a plurality of printed circuit boards (PCB's), each PCB of the plurality of PCB's comprising:
a plurality of switches respectively grouped into a plurality of groups; and
a plurality of computing devices arranged in the plurality of groups; and
a midplane printed circuit board (PCB) configured to receive each of the plurality of PCB's,
wherein switches, of the plurality of switches, in a same group of the plurality of groups, are configured to be fully connected in an electrical manner to computing devices, of the plurality of computing devices, in the same group,
wherein each of multiple switches of the plurality of switches, comprised in a first group among the plurality of groups is configured to have a one-to-one connection with one switch of the multiple switches of the plurality of switches comprised in each remaining group among the plurality of groups,
wherein communication between a first switch of the plurality of switches within a first PCB with a second switch of the plurality of switches from a different PCB occurs across the midplane PCB, and wherein the computing devices and the switches are arranged in a printed circuit board (PCB) within a predetermined range based on a link budget of an electrical interface, and wherein the predetermined range is a trace length less than 460 millimeters.

2. The device of claim 1, wherein electrical connections are provided between the computing devices in the same group and the switches in the same group, and electrical connections are provided between respective switches in one or more other groups of the plurality of groups.

3. The device of claim 1, wherein the switches in the same group are connected to the computing devices in the same group, and wherein the computing devices in the same group are connected to the switches in the same group.

4. The device of claim 1, wherein a total number of the switches in the same group is less than or equal to a total number of lanes allocated to each of the computing devices in the same group.

5. The device of claim 4, wherein the total number of the switches in the same group is determined based on a result obtained by dividing, by an integer, the total number of lanes.

6. The device of claim 1, wherein a same total number of lanes allocated to each of the computing devices in the same group is allocated to the switches in the same group.

7. The device of claim 1, wherein a total number of the computing devices in the same group is determined based on a total number of the switches in the same group, a total number of lanes allocated to each of the switches in the same group, and a total number of lanes allocated to each of the computing devices in the same group.

8. The device of claim 1, wherein, for switch connections between groups of the plurality of groups, each of the plurality of groups use respective connectors for an associated PCB of the plurality of PCB's to connect to the midplane PCB.

9. The device of claim 1, wherein a total number of respective computing devices in each of the plurality of groups is a same number.

10. The device of claim 1, wherein a total number of respective switches in each of the plurality of groups is a same number.

11. The device of claim 1, wherein each of the plurality of computing devices comprises:

a processor; and a high bandwidth memory (HBM).

12. The device of claim 1, wherein the one-to-one connections between the devices in the same group and the switches in the same group, and the one-to-one connections between the respective switches are implemented based on a link budget configured to comply with loss budget requirements of PCIe Gen 5 standard.

13. The device of claim 1, wherein the plurality of groups are physically separated from each other in respective different circuitries.

14. The device of claim 1, wherein respective trace lengths between the plurality of computing devices and the plurality switches for each of the plurality of PCB's is less than or equal to 460 millimeters in an electrical interconnection.

15. A method, comprising:

partitioning data to be transmitted from a first computing device in a first group of a plurality of groups to a second computing device in a second group of the plurality of groups, and transmitting the partitioned data to first switches in the first group based on a full connection in an electrical manner between the first computing device and each of the first switches in the first group;

transmitting the partitioned data to second switches in the second group based on an connection between the first switches in the first group and the second switches in the second group; and transmitting the partitioned data from the second switches to the second computing device based on a full connection between each of the second switches and the second computing device, wherein each group of the plurality of groups comprises a respective plurality of computing devices including the first computing device in the first group and the second computing device in the second group, wherein each one of the first switches is configured to have a one-to-one connection with a corresponding one of the second switches in each remaining group among the plurality of groups, wherein each computing device of the plurality of computing devices including the first computing device and the second computing device are connected to respective switches of a plurality of switches including the first switches and the second switches in an electrical interconnection network, and wherein the computing devices and the switches are arranged in a printed circuit board (PCB) within a predetermined range based on a link budget of an electrical interface, and wherein the predetermined range is a trace length less than 460 millimeters.

16. The method of claim 15, wherein switches in a same group are connected to respective computing devices in the same group, and wherein the respective computing devices in the same group are connected to respective switches in the same group.

17. The method of claim 15, wherein switches in a same group are not connected to each other, and wherein the first computing device and the second computing device comprises:

a processor; and a high bandwidth memory (HBM).

18. The method of claim 15, wherein a total number of switches in a same group is less than or equal to a total number of lanes allocated to each computing device in the same group.

19. The method of claim 15, wherein the electrical interconnection network is configured to comply with loss budget requirements of PCIe Gen 5 standard.

20. The method of claim 15, wherein respective computing devices of the plurality of computing devices and respective switches of the plurality are provided on two or more printed circuit boards (PCB's), and wherein the plurality of switches for each of the one or more PCB's are electrically connected to each other across a midplane printed circuit board (PCB).

* * * * *